Jan. 16, 1951 M. A. CROSBY 2,538,414
METHOD OF MAKING WIRE-WRAPPED BELTS
Original Filed March 8, 1943
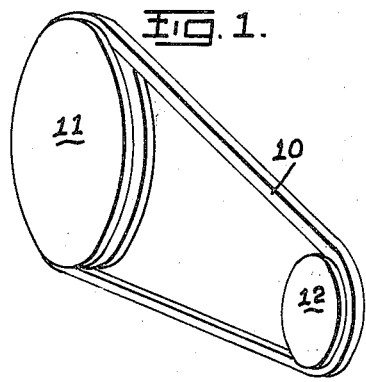
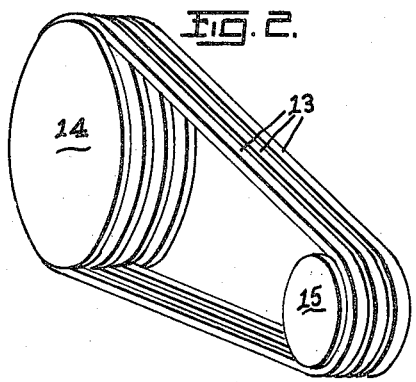
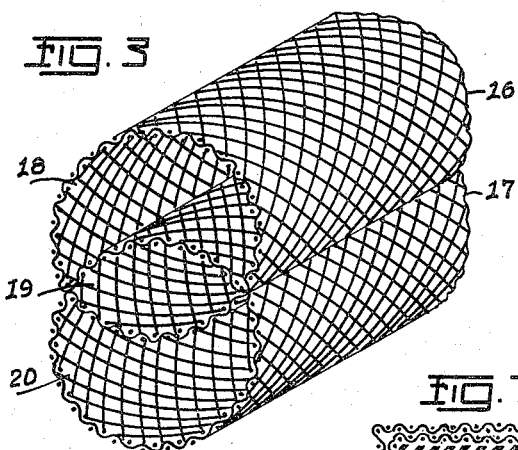
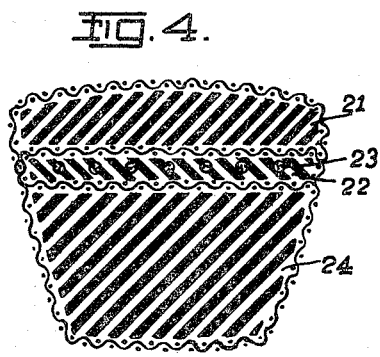
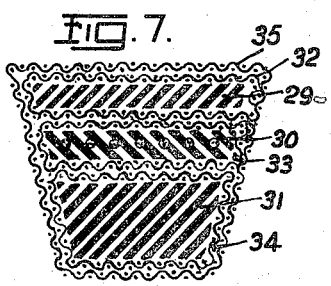
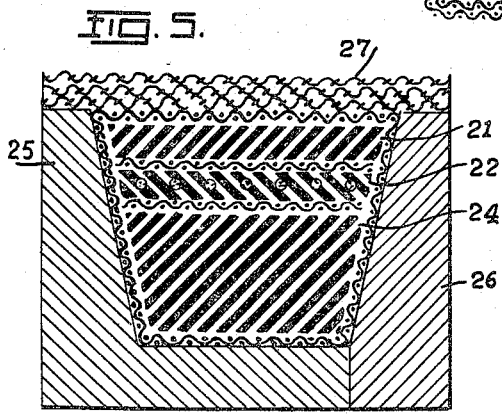
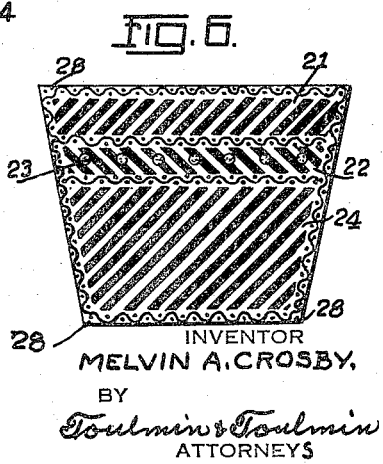
INVENTOR
MELVIN A. CROSBY,
BY
Toulmin & Toulmin
ATTORNEYS Patented Jan. 16, 1951

2,538,414

UNITED STATES PATENT OFFICE 2,538,414

METHOD OF MAKING WIRE-WRAPPED BELTS

Melvin A. Crosby, Dayton, Ohio, assignor to The Dayton Rubber Company, a corporation of Ohio Original application March 8, 1943, Serial No. 478,433, now Patent No. 2,411,027, dated November 12, 1946. Divided and this application July 24, 1946, Serial No. 686,041

7 Claims. (Cl. 154—4)

This invention refers to a method of making belts, and more particularly of making a V-type belt in which the tension, neutral axis and compression sections are surrounded by and reinforced with woven metal cloth.

This application is a division of my copending application Serial No. 478,433 filed March 8, 1943, now Patent No. 2,411,027.

The belt made by the method of the present invention is characterized by long service life, resistance to frictional abrasion, high flexibility, and substantial inextensibility. It may be manufactured in the usual V-belt style with smooth top and bottom surfaces or it may be provided with grooves transverse of the longitudinal axis of the belt on either the top or the bottom surfaces or on both for the purpose of increasing the flexibility or to reduce internal stresses when the belt passes over pulleys of small diameter, thereby insuring a cooler running belt and a greater service life.

The nature of the present invention will be better understood from the following description taken in connection with the annexed drawing, in which:

Fig. 1 is a diagrammatic illustration of a single belt V-drive;

Fig. 2 is a diagrammatic illustration of a multiple belt V-drive;

Fig. 3 is a perspective view of the dual metal cloth tubes employed in the manufacture of the belt of this invention;

Fig. 4 is a cross sectional view of a roughly formed belt body prior to vulcanization made according to the present invention;

Fig. 5 is a cross sectional view illustrating one manner of molding the belt of the present invention;

Fig. 6 is a cross sectional view of the finished belt made by the method of the present invention; and Fig. 7 is a cross sectional view of another belt made by the method of the invention.

Referring to the drawing in detail, in Fig. 1, 10 represents a belt made by the method of the present invention passing over pulleys or sheaves 11 and 12 as in a single belt drive, while in Fig. 2, 13 represents a plurality of belts made according to the present invention passing over pulleys or sheaves 14 and 15 as in a multiple belt drive.

Fig. 3 illustrates integrally woven wire cloth tubes or sleeves 16 and 17 providing compartments 18, 19 and 20. The compartments 18, 19 and 20 are adapted to comprise the tension, neutral axis and compression sections of a belt, respectively. In the practice of the present invention a layer of rubber composition is inserted by extrusion or otherwise in the compartment 18, a similar layer including a plurality of parallelly laid cords is inserted in the compartment 19 by similar means, and a third layer of rubber composition is inserted by similar means in the compartment 20.

The structure of Fig. 3, after the several layers have been inserted in compartments 18, 19 and 20 is subjected to a forming operation to give it the general configuration of a V-belt and in the course of this operation the compartments 18, 19 and 20 are deformed and molded to the general shape illustrated in Fig. 4. The layer of rubber composition which was inserted in the compartment 18 becomes the tension layer 21, the layer of rubber composition which was inserted in the compartment 19 becomes the neutral axis section 22 reinforced with the parallelly laid cords 23, and the layer of rubber composition inserted in the compartment 20 becomes the compression section 24 of the belt. The deformation of the dual tubes 16 and 17 provides the structure illustrated in Fig. 4 wherein the tension, neutral axis and compression sections of the belt are each surrounded by and reinforced with the woven wire cloth which originally formed the dual tubes 16 and 17.

The roughly formed V-belt of Fig. 4 is then placed in a mold as shown in Fig. 5. The mold consists of a fixed section 25 and a removable section 26. The belt of Fig. 4 is placed in position between the mold sections 25 and 26 and a wet wrapper of fabric 27 is wound around the periphery of the mold. The mold is then placed in a vulcanizer wherein the evaporation of moisture from the wet wrapper 27 causes shrinkage of said wrapper 27 and the exertion of pressure on the belt body within the mold. At the end of the vulcanizing period, the belt body is removed from the mold and the resulting product is substantially as shown in Fig. 6.

It will be noted from Fig. 6 that during the vulcanizing operation, due to the influence of heat and pressure, part of a rubber composition forming the tension, neutral axis and compression sections 21, 22 and 24, respectively, is squeezed or pushed out through the woven wire cloth surrounding the belt body so that, in effect, the finished belt includes a thin outer coating or covering of rubber 28. Therefore, when passing over a sheave or pulley the frictional engagement is between the pulley faces and the thin rubber coating on the side walls of the belt. After this thin rubber coating wears down, the woven metal cloth is exposed and comes into contact with the pulley faces, but sufficient rubber remains in the apertures between the individual strands of wire of the metal cloth to provide frictional engagement between the rubber of the belt and the metal of the pulley.

It will be understood that it is advantageous that the woven wire dual tubes have the wires running at a bias in order that maximum stretch or flexibility may be imparted to the belt as it passes over sheaves or pulleys of small diameter.

It will be understood also that instead of using integrally woven dual tubes, the individual sections of the belt (see Figure 7, tension section 29, neutral axis section 30 and compression sections 31) may be wrapped in individual metal cloth wrappers 32, 33, 34, respectively, and superposed one upon the other in proper relationship and the whole then wrapped with a further layer of metal cloth 35. The resulting structure would be substantially the same in effect as the structure which has been illustrated in the annexed drawing and described hereinbefore, but it would be stronger and in some instances more satisfactory from the point of view of manufacturing.

In describing and illustrating in the drawing the mold employed in carrying out the present invention, a mold adapted to produce a plain V-belt has been described and illustrated, but those skilled in the art will understand that a mold adapted to produce cogs and grooves on the underside or on the outer side or on both sides of the belt could be substituted for the production of cogged or grooved belts.

The cords 23 forming part of the neutral axis section 22 may comprise thin metal wires or cables or cords made of organic fibrous material such as cotton or rayon or of inorganic fibrous material such as fine glass fiber. Obviously, more than one layer of cords may be employed if necessary, the choice depending on the type of belt being manufactured and the service in which it is to be employed.

While there have been described herein and illustrated in the drawing certain particular embodiments of this invention, it is not intended that this invention be limited to or circumscribed by the specific details herein described or illustrated in the drawings in view of the fact that this invention is susceptible to modifications depending on individual preference and conditions without departing from the spirit of this disclosure and the scope of the appended claims.

I claim:

1. The method of making a belt which comprises forming three hollow tubular superimposed sections of metal cloth, filling said two outer sections with rubber material and said intermediate section with rubber material reinforced by a plurality of cords parallelly arranged to each other and to the longitudinal axis of said tubes, wrapping said superimposed filled sections with a wet cloth, and vulcanizing the assembled parts under heat and pressure whereby a unitary article is formed.

2. The method of making a belt which comprises forming three hollow tubular superimposed sections of metal cloth, all of the threads of said metal cloth being arranged in an angle to the longitudinal axis of said tubular sections, filling said two outer sections with rubber material and said intermediate section with rubber material reinforced by a plurality of cords parallelly arranged to each other and to the longitudinal axis of said tubes, wrapping said superimposed filled sections with a wet cloth, and vulcanizing the assembled parts under heat and pressure whereby a unitary article is formed.

3. The method of making a belt which comprises forming three hollow tubular superimposed sections of metal cloth, filling said two outer sections with rubber material and said intermediate section with rubber material reinforced by a plurality of cords parallelly arranged to each other and to the longitudinal axis of said tubes, said filling operation being carried out by extrusion, wrapping said superimposed filled sections with a wet cloth, and vulcanizing the assembled parts under heat and pressure whereby a unitary article is formed.

4. The method of making a belt which comprises forming three hollow tubular superimposed sections of metal cloth, filling said two outer sections with rubber material and said intermediate section with rubber material reinforced by a plurality of cords parallelly arranged to each other and to the longitudinal axis of said tubes, wrapping said superimposed filled sections with a wet cloth, and vulcanizing the assembled parts under heat and pressure whereby a unitary article is formed and part of the rubber is squeezed through the interstices of said metal cloth and a thin outer rubber coating is obtained on the surface of said belt.

5. A method of making a belt which comprises forming a plurality of compartments of woven wire, placing a layer of rubber composition adapted to form a tension section in one of said compartments, placing a layer of rubber composition reinforced with parallelly-laid cords adapted to form a neutral axis section in another of said compartments, placing a layer of rubber composition adapted to form a compression section in another of said compartments, pressing the resulting body to a rough predetermined shape whereby said layers adapted to form tension, neutral axis and compression sections, respectively, are caused to lie in superimposed substantially parallel position with respect to each other, and vulcanizing said roughly formed article under the influence of heat and pressure to form a unitary belt structure.

6. The method of making a belt which comprises wrapping a layer of rubber composition adapted to form a tension section in woven metal cloth, wrapping a layer of rubber composition comprising a plurality of cords laid parallel to each other adapted to form a neutral axis section in woven metal cloth, wrapping a layer of rubber composition adapted to form a compression section in woven wire cloth, placing said wrapped layer adapted to form a neutral axis section between the said other two layers, wrapping the superposed layers in woven metal cloth, and vulcanizing the resulting body under heat and pressure to form a unitary article.

7. The method of making a belt having tension, neutral axis, and compression sections comprising rubber composition which comprises individually surrounding each of the said sections with a wrapper of metal cloth, and also surrounding the entire belt with a wrapper of metal cloth, and vulcanizing the resulting assembly into an integral unit.

MELVIN A. CROSBY.

REFERENCES CITED

The following references are of record in the file of this patent:

UNITED STATES PATENTS

| Number | Name | Date |
|---|---|---|
| 1,012,030 | Underwood | Dec. 19, 1911 |
| 1,036,428 | Bissell | Aug. 20, 1912 |
| 1,052,106 | Voorhees | Feb. 4, 1913 |
| 1,906,397 | Meyer | May 2, 1933 |
| 2,195,126 | Smith et al. | Mar. 26, 1940 |
| 2,336,084 | Freedlander | Dec. 7, 1943 |
| 2,409,087 | Weinberger | Oct. 8, 1946 |